Figure 1:
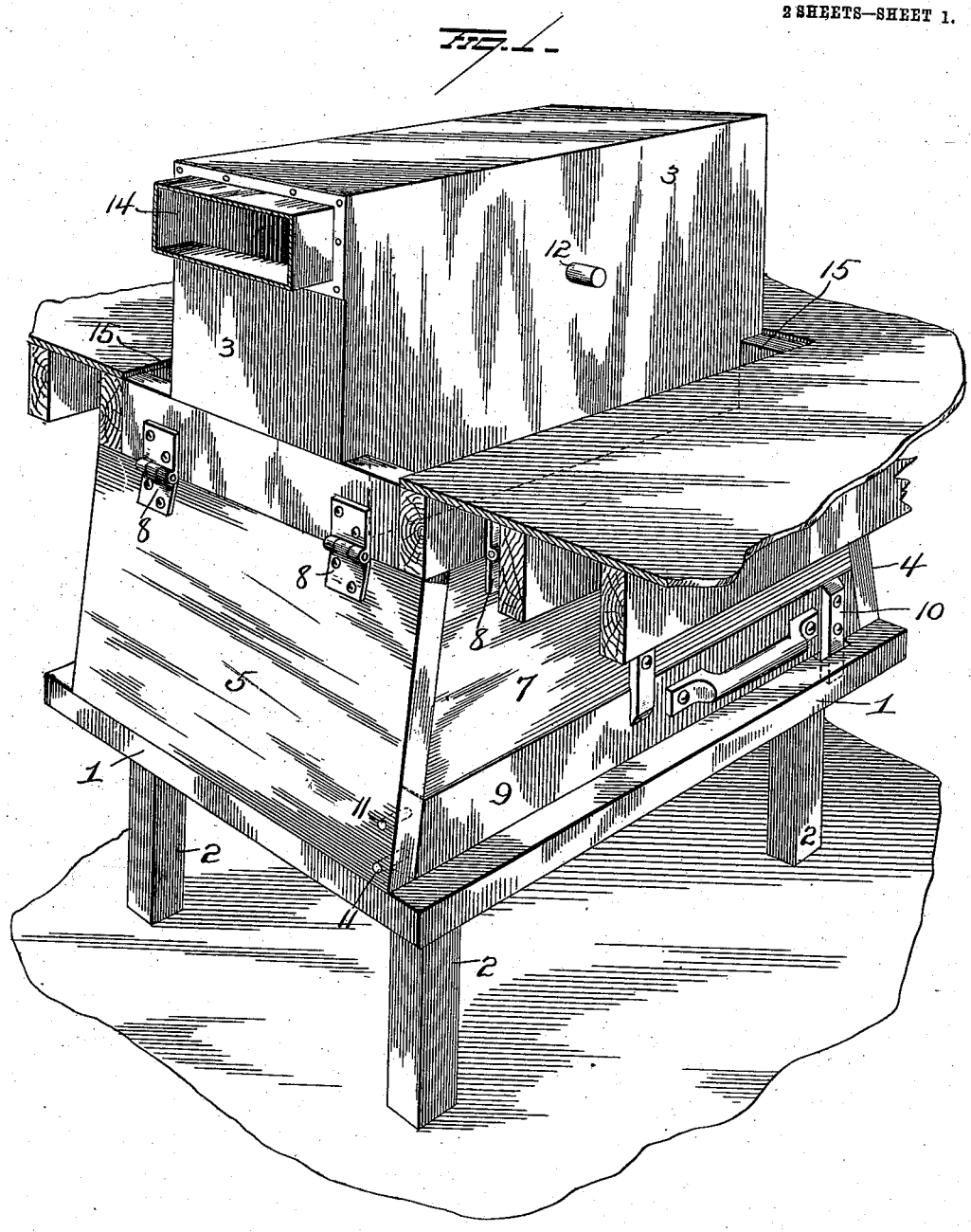

No. 858,453. PATENTED JULY 2, 1907.
D. HAYNES.
BAT FORMING APPARATUS.
APPLICATION FILED NOV. 22, 1906.

2 SHEETS—SHEET 1.

WITNESSES
E. I. Nottingham
G. J. Downing

INVENTOR
D. Haynes
By H. G. Seymour
Attorney

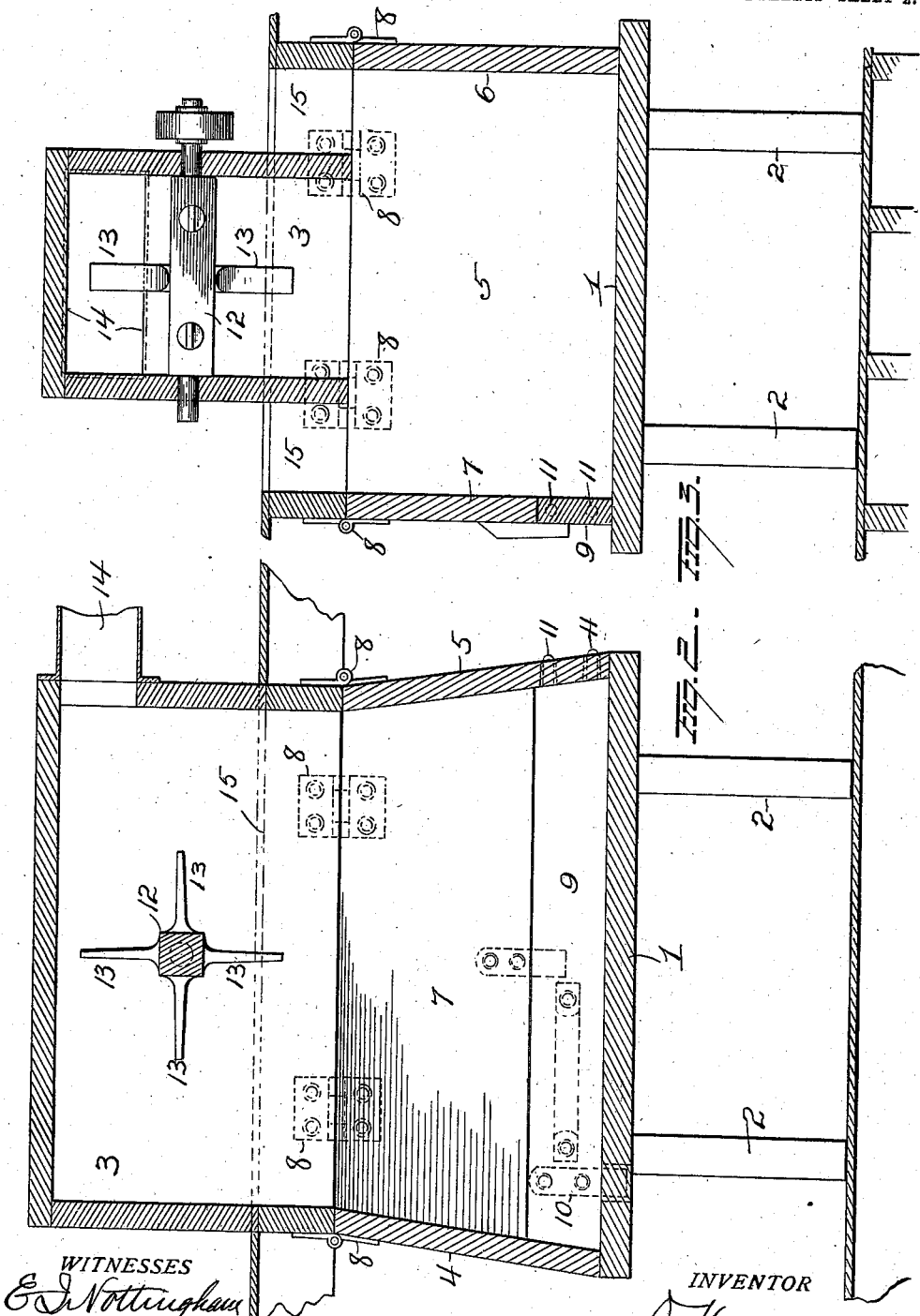

UNITED STATES PATENT OFFICE.

DANIEL HAYNES, OF RINGGOLD, TEXAS.

BAT-FORMING APPARATUS.

No. 858,453.  Specification of Letters Patent.  Patented July 2, 1907.

Application filed November 22, 1906. Serial No. 344,579.

*To all whom it may concern:*

Be it known that I, DANIEL HAYNES, a resident of Ringgold, in the county of Montague and State of Texas, have invented certain new and useful Improvements in Bat-Forming Apparatus; and I do hereby declare the following to be a full, clear, and exact description of the invention, such as will enable others skilled in the art to which it appertains to make and use the same.

My invention relates to improvements in bat forming apparatus, the object of the invention being to provide an improved apparatus into which the cotton or other disintegrated material is fed by a current of air and evenly distributed throughout a prescribed area to supply an even depth of material throughout.

With this and other objects in view, the invention consists in certain novel features of construction and combinations and arrangements of parts as will be more fully hereinafter described and pointed out in the claims.

In the accompanying drawings, Figure 1 is a perspective view illustrating my improved apparatus. Fig. 2 is a view in longitudinal section. Fig. 3 is a view in cross section.

1 represents a base or platform, onto which the material is to be deposited to form the bat, and this platform may be supported on suitable legs 2.

3 represents a box or guide chamber, located preferably in a room above the platform 1, and communicating with an opening in the floor of the same size as the box and directly above the platform, so that material fed to the box will fall down onto the platform 1.

The mold is formed by a series of gates 4, 5, 6, and 7, connected by hinges 8 to the ceiling of the room above platform 1, and when the gates 4, 5, and 6, are swung down onto the platform 1, their lower edges will bear on the platform and constitute the ends and one side of the mold. The other side gate 7, is shorter than gates 4, 5, and 6, and the space between the lower edge of the gate 7 and platform 1, is closed by a removable board 9, which latter has a depending lug 10 near one end, to enter an opening in platform 1, and said board is provided at its other end, with pins 11, to enter openings in end gate 4, and by this means retain itself in position, yet permit its ready removal when desired.

In the boxing 3, a shaft 12 is mounted and turned by any suitable mechanism. A stirrer 13, comprising a series of radial arms, is secured on the shaft 12 in the boxing to separate the particles of disintegrated material fed into the boxing and scatter it throughout the wide area so that it will fall evenly onto the platform below.

An opening 14 is provided in one end of the boxing 3, to admit the disintegrated material fed thereinto by a current of air, and openings 15 are provided in the floor at the sides of the box and above the platform 1, to permit the free escape of the air.

Other means may of course be provided to permit the air to escape and other devices may be provided to scatter the material throughout the mold, and hence I do not restrict myself to the precise details set forth but consider myself at liberty to make such slight changes and alterations as fairly fall within the spirit and scope of my invention.

Having fully described my invention, what I claim as new and desire to secure by Letters-Patent is:—

1. In an apparatus of the character described, the combination with a platform, of means located over the platform for disintegrating material in its fall to the platform to evenly distribute the material over the same.

2. In an apparatus of the character described, the combination with a platform, of gates located thereon to form a mold, and means located over the platform for disintegrating material in its fall into the mold to evenly distribute the material in its fall onto the platform.

3. In an apparatus of the character described, the combination with a platform, of gates located thereon to form a mold, of a rotary stirrer over the mold and in the passage of material thereinto, to disintegrate the material and compel its even distribution over the platform in its fall thereon.

4. In an apparatus of the character described, the combination with a platform, of hinged gates normally resting on the platform to form a mold thereon, means for directing a current of air and disintegrated material into the mold thus formed, and means for scattering the material to compel its even distribution throughout the mold in its fall to the platform.

5. In an apparatus of the character described, the combination with a platform, of hinged gates forming four sides of a mold on the platform, a box above the mold and communicating therewith and adapted to receive disintegrated material forced therein by a current of air, and a rotary stirrer in said box.

6. The combination with a mold, of means providing a single inlet for air and bat-forming material over the mold, and means over the mold for disintegrating and scattering the bat-forming material.

7. The combination with a mold having an air outlet, of a box over said mold and having an inlet for air and bat-forming material, and means within said box for disintegrating and scattering the bat-forming material.

In testimony whereof, I have signed this specification in the presence of two subscribing witnesses.

D. HAYNES.

Witnesses:
L. E. HAYNES,
J. W. KOY.